US006106723A

United States Patent [19]
Grandics et al.

[11] Patent Number: 6,106,723
[45] Date of Patent: Aug. 22, 2000

[54] METHOD FOR REMOVING PYROGENS FROM DIALYSATE

[76] Inventors: Peter Grandics; Susan Szathmary, both of P.O. Box 188158; Edit Hegyi, P.O. Box 188232, all of Carlsbad, Calif. 92009

[21] Appl. No.: 09/071,278

[22] Filed: May 1, 1998

Related U.S. Application Data

[63] Continuation-in-part of application No. 08/798,432, Feb. 10, 1997, abandoned.

[51] Int. Cl.[7] .................................................. B01D 61/00
[52] U.S. Cl. ................ 210/651; 210/500.1; 210/502.1; 210/652; 210/660; 210/661; 210/688; 210/198.2; 210/500.27
[58] Field of Search ................ 210/502.1, 651, 210/652, 634, 490, 688, 198.2, 660, 661, 500.27, 500.1; 428/320.2; 264/48, 49

[56] References Cited

U.S. PATENT DOCUMENTS

| | | | |
|---|---|---|---|
| 3,959,128 | 5/1976 | Harris . | |
| 4,495,067 | 1/1985 | Klein et al. ................ | 210/87 |
| 4,610,790 | 9/1986 | Reti et al. ................ | 210/636 |
| 4,693,985 | 9/1987 | Degen et al. ................ | 210/198.2 |
| 5,045,190 | 9/1991 | Carbonell et al. ................ | 210/198.2 |
| 5,120,443 | 6/1992 | Bruening et al. ................ | 210/638 |
| 5,173,470 | 12/1992 | Bruening et al. ................ | 502/401 |
| 5,244,856 | 9/1993 | Bruening et al. ................ | 502/158 |
| 5,279,821 | 1/1994 | Hirayama et al. ................ | 424/78.17 |
| 5,466,377 | 11/1995 | Grandics et al. ................ | 210/635 |
| 5,547,760 | 8/1996 | Tarbet et al. ................ | 428/471 |
| 5,571,720 | 11/1996 | Grandics et al. ................ | 435/286.1 |
| 5,618,433 | 4/1997 | Tarbet et al. ................ | 210/634 |

*Primary Examiner*—Ana Fortuna
*Attorney, Agent, or Firm*—Pillsbury Madison & Sutro LLP

[57] ABSTRACT

A new method is described to produce large volumes of low cost water for injection directly from potable water in order to meet the needs of hemodialysis and other biological applications for ultrapure water. The source water is processed by a combination of membrane and chromatographic methods including reverse osmosis, ion exchange deionization, endotoxin-specific adsorption steps and polishing filtration to reduce contaminant levels below those specified by the US Pharmacopoiea. Endotoxin removal from dialysate was demonstrated. The endotoxin removing adsorbent also adsorbs LAL-negative pyrogens from the test samples.

21 Claims, 7 Drawing Sheets

FIG. 2

Endotoxin Levels of RO Water and Deionizer Column Flowthrough

Graph shows endotoxin levels from RO water and deionizer column flowthroughs. The deionizer column plays a duel role as to both reducing ion concentrations and endotoxin levels from RO water.

METHOD FOR REMOVING PYROGENS FROM DIALYSATE

This application is a continuation-in-part of U.S. Ser. No. 08/798,432, filed Feb. 10, 1997 abandoned.

BACKGROUND OF THE INVENTION

Endotoxin (ET) produced by the ubiquitous Gram-negative bacteria is an increasing concern in nephrology. Water for dialysis and dialysate are not sterile, and contain significant concentrations of bacteria and ET. During hemodialysis, the patient's blood is separated from the dialysate by a membrane whose molecular weight cut-off is about 20–40 kDa. In a dialysis session, 90–120 liters of dialysate are passed through the dialyzer. The most common dialysis regimen is 12 hours per week. The volume of dialysate used per patient per year is about 15,000 liters. According to existing water purity standards set by the AAMI, this translates into approximately 75 million endotoxin unit (EU) of ET and 30 billion bacteria passing through the "water side" of the dialyzer during one year of hemodialysis treatment. Recognizing that water systems are the main source of endotoxin contamination, the National Kidney Foundation recommends monthly LAL testing to monitor endotoxin levels in the water systems of dialysis centers.

Surveys of microbial and endotoxin contamination in reverse osmosis water and dialysate of different dialysis units of the U.S. and other countries frequently find colony forming unit (CFU) per ml and ET levels exceeding current AAMI standards. In a recent survey, 19–35% of water samples from dialysis centers had bacterial counts above the AAMI standards and 6% of dialysate samples exceeded the AAMI endotoxin limit (5 EU/ml water).

In the typical dialysis system, blood and dialysate are pumped into the dialyzer from opposite directions. At the inlet of dialysate, the hydrostatic pressure on water side can be higher than the hydrostatic pressure on the blood side. This facilitates the transfer of ET into the blood (backfiltration). ET also quickly adsorbs to the hydrophobic high-flux membranes. Displacement of adsorbed endotoxin by blood components may then take place.

In the first decades of artificial kidney treatment, technical efforts focused on developing effective dialysis membranes, machines and water systems. In the 1970s, some articles discussing the importance of pyrogenic reactions during hemodialysis induced installation of reverse osmosis system for preparation of more pure dialysis fluid. In the last decade, growing knowledge of the function of endothelial cells and their role in disease has helped to understand the possible alterations in endothelial cell structure and function evoked by uremia and its dialytic therapy.

Factors injuring the endothelium during hemodialysis include complement activation due to membrane contact, bacterial endotoxins, endotoxin containing immunocomplexes, hyperlipidemia, and cell adhesions. The activated monocytes migrate through endothelial intracellular junctions becoming macrophages; the filtered LDL particles transform them into foam cells. Bacterial endotoxin activates monocytes and the other white blood cells, increasing the chance for endothelial cell injury, arteriosclerosis and inflammatory problems such as amyloidosis.

Several articles discuss the significance of endotoxin transfer through dialysis membranes with cut-off points of 20–40 kDa. Komuro and Nakazawa have demonstrated that bacterial endotoxins in dialysates have two different molecular sizes, with one about 4 kDa (Komuro, T., Nakazawa, R.: Int. J. Artif. Organs (1993) 16:245–248). Urena and Herbelin (Urena, P., et al. Nephrol. Dial. Transplant. (1992) 7:16–28) used radiolabelled $E.$ $coli$ lipopolysaccharide ($^{125}$I M-LPS) to demonstrate that 7–10% of the radiolabelled lipopolysaccharide transferred from the dialysate to the blood side after a 4-hour recirculation period. The polysulfone (PS) and the polyacrylonitrile membranes (PAN) bound 10–17% of total initial activity of the radioactivity. The results suggest reduced LPS transfer across the Cuprophane (CU) membrane. The molecular weight of LPS units transferred through the membranes was <43 kDa.

In similar experiments using Neisseria and Pseudomonas LPS, Laude-Sharp and Caroff demonstrated transmembrane passage of 1–8% of radiolabelled LPS (Laude-Sharp, M., et al.: Kidney Int. (1990) 38:1089–1094.). Between 5–70% of the radioactive LPS absorbed onto the membranes. PS exhibited the highest binding capacity for LPS. Vanholder and Haecke evaluated the dialysate and serum endotoxin concentrations in vivo before and after hemodialysis with small pore (PS400-F6, Fresenius, Germany) and large pore (PS600-F60, Fresenius, Germany) PS dialyzers. They detected significant Pseudomonas endotoxin transfer through PS600 membranes (Vanholder, R., et al.: Nephrol. Dial. Transplant. (1992) 7:333–339). The possible long-term consequences of cell stimulation and the subsequent release of inflammatory mediators such as Tumor Necrosis Factor alpha (TNF-alpha) and Interleukin-1 (IL-1) are a major concern. Use of sterile and endotoxin free dialysate significantly decreased the interleukin levels in patients' blood. Release of the endotoxin-binding monocyte receptor protein CD14 into the plasma was demonstrated in vivo during hemodialysis when the dialysate contained endotoxin (Bambauer, R., et al.: ASAIOTransactions (1990) 36, M317–320).

Dialysis amyloidosis is considered an inflammatory disease; the major protein of amyloid deposits is beta-2-microglobulin. Synthesis of this protein in macrophages is enhanced by endotoxins. Therefore, dialysis water contaminated with endotoxin may contribute to this process. Baz, et al. have shown that the onset of amyloidosis in long-term dialysis patients was considerably delayed when ultrapure dialysate was used (Baz, M., et al.: Int. J. Artif. Organs (1991) 14:681–685).

Many studies emphasize the importance of endotoxin-free dialysate and conclude that finding of transmembrane passage of low molecular weight intact species of LPS that are found in clinically used dialysates emphasizes the importance of obtaining LPS-free dialysates in order to improve the biocompatibility of hemodialysis (for a review, see Lonnemann, G. et al., Nephrol. Dial. Transplant. (1996) 11:946–949).

It is also becoming evident that besides endotoxin other pyrogenic substances must be removed when trying to prepare pyrogen-free water and dialysate for kidney dialysis. Klein et al. (Artif. Organs (1990) 14:85–94) have found that the primary bacterial species in contaminated water and dialysate was Pseudomonas. Pyrogenic substances originating from bacterial debris include LPS, peptidoglycans, muramyl peptides, exotoxin A and other substances yet to be identified. Of particular interest is a small (<1000 dalton) cytokine-inducing fragment of exotoxin A found in bicarbonate dialysate contaminated with $Pseudomonas$ $aeruginosa$ (Mahiout, A. et al. J. Am. Soc. Nephrol. (1995) 6: 573). This low molecular weight, heat-stable, Pseudomonas pyrogen was partially purified and characterized (Massion, P. et al. J. Clin. Invest. (1994) 93: 26–32). There is a possibility that such a substance can penetrate even the tightest ultrafiltration membrane.

There are significant reasons to reduce pyrogen exposure of hemodialysis patients. The most acute is obviously to eliminate pyrogenic reactions. However, even more critical effects of long-term exposure to pyrogens include chronic leucocyte and monocyte activation, platelet activation, increased adhesiveness and aggregation, and complement activation which together with hyperlipidemia cause endothelium damage and lipid deposition in the arterial wall.

Efforts to produce more biocompatible dialysis membranes are hampered when pyrogenic substances are present during dialysis. The hemodialysis procedure by itself leads to activation of complement and coagulation proteins, platelets, leukocytes and the monocyte-macrophage system. When these effects are compounded by endotoxin, endothelium damage is increased. Hyperlipoproteinemia is also very common in patients with ESRD; together with the endothelium damage caused by endotoxin stimulus and extracorporeal treatment. It increases morbidity and mortality of the patient population from cardiovascular diseases. Endotoxin therefore, may significantly influence the long-term care and the cost of care in these patients due to cardiovascular complications.

This problem is very significant. In 1991, the gross mortality rate of chronic dialysis patients in the U.S. was over 20 percent, and in the active age population (<55 years old) it exceeded 10 percent (Health Care Financing Research Report, End Stage Renal Disease (1991). Fifty percent of the patients died from cardiovascular diseases (Parfrey, P. S., Harnett, J. D.: ASAIOTransactions (1994) 40:121–129).

It has been demonstrated that bacterium and endotoxin-free dialysate resulted in reduced activation of monocytes and lower levels of interleukins and tumor necrosis factor in the patient's blood. Therefore, it is expected that regular use of sterile and endotoxin-free dialysate will help decrease the cardiovascular morbidity and mortality rate of patients undergoing hemodialysis. Since more than 50 percent of the patient population undergoing dialysis treatment is less than 65 years old, preserving their ability to work is very important. Procedures helping to slow the progression of cardiovascular diseases in patients undergoing hemodialysis will help decrease the cost of treatment and may improve the success of renal transplantation.

There is a need to develop a new technology for producing WFI quality water for dialysis without significantly affecting the cost of dialysis. The source water for dialysis is potable water. Even after treatment by the water companies, potable water-although safe to drink-contains low levels of mineral salts, trace metals, organic compounds, dissolved gases and colloidal matter, together with particles in suspension and microorganisms. Moreover, unlike other raw materials, water supplies vary widely in quality, both geographically and seasonally.

Before water can be used in the manufacture of biopharmaceuticals, it must be purged of its impurities to a degree which is defined by the pharmacopoeias and regulatory authorities like FDA. The most widely used and accepted method to produce WFI is distillation which makes WFI expensive. The quality of WFI is defined in terms of acceptable limits for inorganic and organic impurities determined by specific physical and chemical tests. WFI must be apyrogenic and free from suspended particles. The FDA recommends that the bacterial count should be below 10 CFU/100 ml. WFI must have a conductivity, measured on-line, less than 1.3 $\mu$S/cm at 25° C. However, the acceptable conductivity range of off-line samples-taking into account pH (which must lie between 5.0 and 7.0), temperature and carbon dioxide equilibrium-is likely to be 2.1 to 4.7 $\mu$S/cm. The maximum acceptable total organic carbon (TOC) level is 500 parts per billion.

The modem approach to purifying water for bioprocessing applications is to use systems incorporating synergistic combinations of purification technologies. These technologies fall into two broad groups: ion-exchange and membrane processes. The major ion-exchange technique is deionization-using both cation-exchange and anion-exchange resins-while the principal membrane processes are reverse osmosis (RO), ultrafiltration (UF) and microfiltration (MF). The hybrid technology called electrodeionization (EDI) utilizes both ion-selective membranes and ion-exchange resins. These methods are then combined with distillation to produce WFI.

There are prior art methods describing the production of WFI without distillation. Reti and Benn (U.S. Pat. No. 4,610,790) disclosed a method using a plurality of filtration and deionization steps producing sterile water. Klein and Beach (U.S. Pat. No. 4,495,067) disclosed a similar system for making endotoxin-free water. We have to note, however, that despite these advances in membrane technology for endotoxin removal, distillation remained the preferred method for WFI. Another invention concerning endotoxin removal from biological fluids was disclosed by Harris (U.S. Pat. No. 3,959,128). He employed non-ionogenic hydrophobic synthetic polymers to adsorb endotoxin from biological fluids.

The literature quoted here points out the complexity of the spectrum of pyrogens present in water and dialysate. The discovery of the heat-stable, low molecular weight pyrogen (s) from Pseudomonas questions the efficacy of ultrafiltration as a tool for pyrogen removal. There is no evidence that the method of Harris would be useful in this regard either.

Hemodialysis requires high volumes of pure water at a low cost. The high cost of producing large volumes of WFI by the standard technique (distillation) precluded its use in hemodialysis even though it is warranted clinically. It would be desirable to develop a system capable of producing on-line WFI at a low cost from potable water in volumes necessary to meet the needs of hemodialysis units.

SUMMARY OF THE INVENTION

The present invention provides a pyrogenic-specific absorbent composition comprising a polymeric support and a multiplicity of ligands comprising an ($C_{10}$–$C_{24}$) alkylamino group. In one embodiment, the composition is endotoxin-specific. Preferably, the support comprises ligands at a density of about 0.1 to about 0.5 mmolar/ml, and more preferably at a density of about 0.2 mmolar/ml. The alkylamino group is a preferably a stearylamino group. In one embodiment, at least a portion of the ligands are crosslinked, preferably at the amino moiety of the alkylamino group with an alkyl group or other suitable crosslinking group.

While any polymeric support can be used to link the alkylamino, preferably the support is agarose. The support can be of any shape, although preferred supports take the form of particles, preferably from about 20 to about 900 microns, and more preferably from about 60 to about 100 microns, or the support may take the form of a porous membrane.

The present invention further provides pyrogenic-specific absorbent composition made by the process of derivatizing a polymeric support with an epihalohydrin; reacting the derivatized support with a ($C_{10}$–$C_{24}$)alkylamine; and crosslinking at least a portion of the alkylamino groups and quaternizing at least a portion of the amino moieties by reacting the support with a halogenated alkyl alcohol. Preferably, the epihalohydrin is epibromohydrin. A preferred crosslinking agent is 2,3-dibromopropanol.

The method also provides a method for removing pyrogens from a fluid comprising contacting the fluid with the composition described herein. The method may include further steps to remove pyrogens and other contaminants. Thus, according to one embodiment, the method further comprises, prior to the contacting step, filtering the fluid through a membrane. This filtration step can include reverse osmosis or ultrafiltration. The method can further comprise, after the filtration steps and prior to the contacting step, deionizing the fluid. In yet a further embodiment, the fluid is polish filtered.

Although the fluid containing the pyrogens can be any fluid, according to a particular embodiment, the fluid is water. In a further embodiment, the fluid is dialyzate.

Preferably, the resulting fluid is rendered substantially free of endotoxin and other non-endotoxin pyrogens.

The present invention further provides a method for producing large volumes of low cost water for injection directly from potable water in order to meet the needs of hemodialysis and other biological applications. In an illustrative embodiment, the water is treated by a membrane, an ion exchange, an endotoxin-specific adsorption process and sterile filtration in order to reduce contaminant levels below those specified by the US Pharmacopoiea.

DETAILED DESCRIPTION OF THE INVENTION

Pursuant to this invention a water purification system is described to produce Water for Injection (WFI) quality water inexpensively, directly from potable water. At present the production of WFI is a complex process which includes several purification steps including membrane filtration, ion exchange and distillation. Distillation is the most widely used final water purification step ensuring an apyrogenic product substantially free from dissolved and particulate contaminants.

Distillation is a low throughput, energy and capital-intensive operation. The cost of WFI produced by distillation may be as high as $5/L. This is prohibitively expensive for the hemodialysis clinics. The system of the subject invention utilizes both membrane filtration and ion exchange as prepurification steps to remove most of the dissolved and particulate contaminants from the potable water source. The high-cost distillation step is replaced by a column-based method to remove residual pyrogenic substances from the water using an adsorbent disclosed in the Examples (trademarked as ClarEtox™, Clarigen, Inc., Carlsbad, Calif.).

Figure 1:
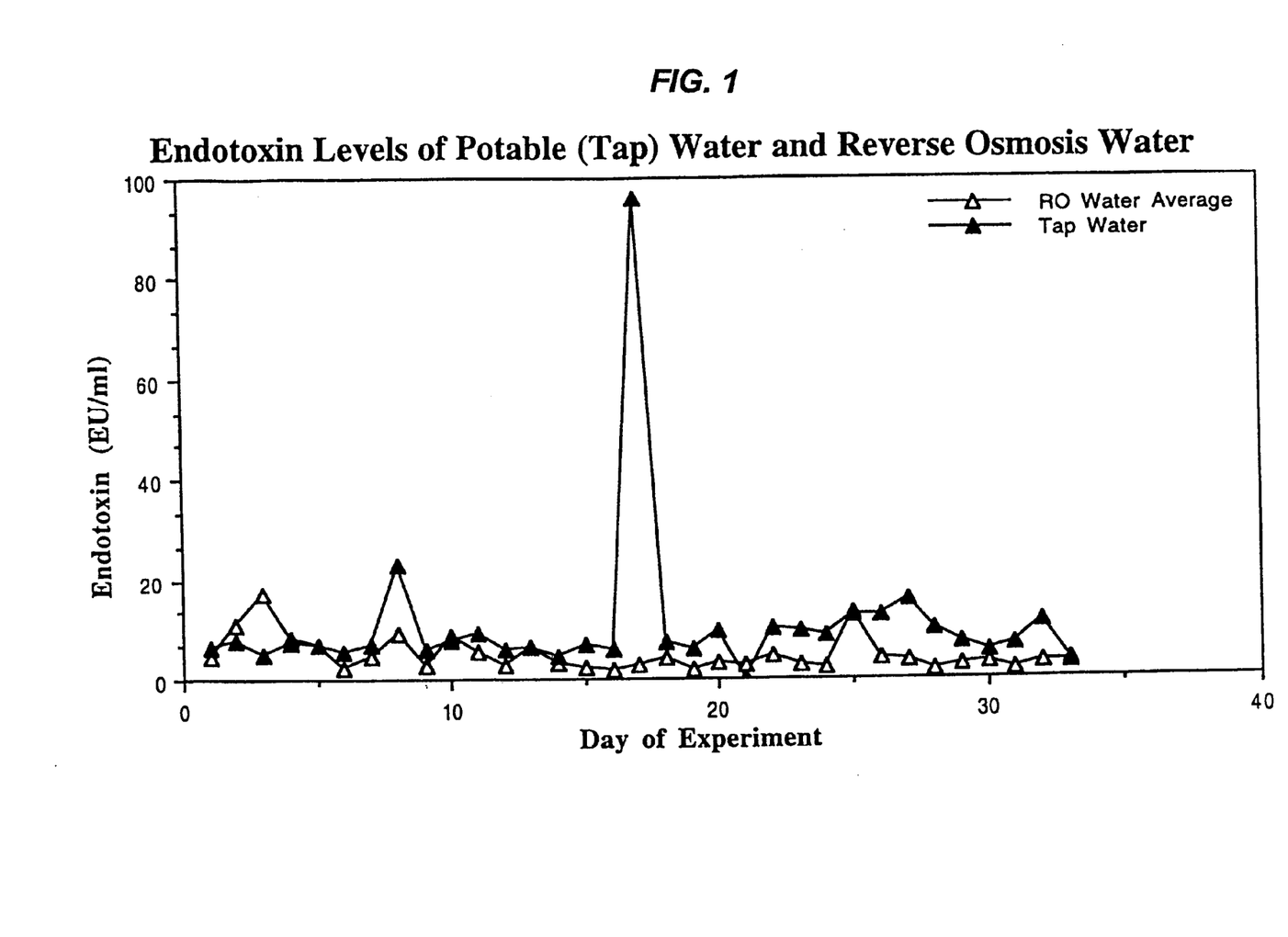
FIG. 1 is a diagram showing endotoxin levels in tap water and reverse osmosis (RO) water samples at the indicated days of operation as described in the preferred embodiments.

In a preferred embodiment, the source potable water is prepurified by reverse osmosis which removes 95–98% of impurities including dissolved salts, colloids, microorganisms, endotoxins and other organic macromolecules. The endotoxin/pyrogen permeability of RO membranes varies and is also a function of the type of endotoxin present. There seems to be no correlation between the extent of endotoxin passage through the RO membrane and the endotoxin content of source potable water (FIG. 1). The RO unit may be protected by prefilters or adsorbents (charcoal and granular median adsorbents) to remove some particulates and chlorine/chloramine from the source water. Besides RO membrane filtration, other membrane technologies, such as ultrafiltration or nanofiltration may also be used as an initial membrane filtration step.

Figure 2:
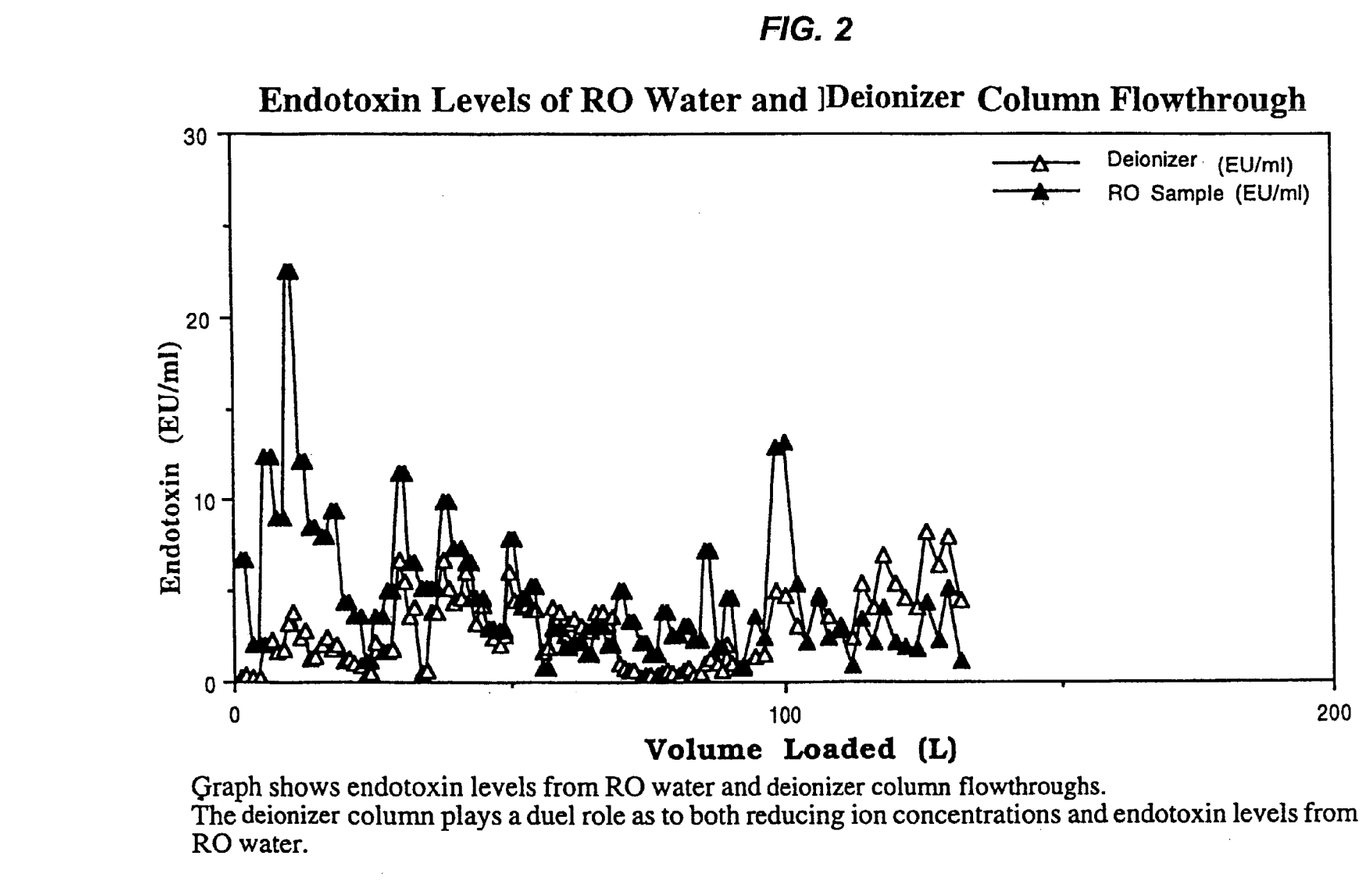
FIG. 2 is a diagram demonstrating endotoxin levels in RO and ion exchange water samples at the indicated days of operation when the two systems operated in a chain.

Deionization is then performed to remove residual dissolved salts and some of the endotoxin. This process typically involves the use of ion exchange media which may take the form of particles, membranes or a combination of both. The ion exchange components require a pretreatment with 1 M HCl and 1 M NaOH, respectively to inactivate entrapped bacteria and bacterial pyrogens. These solutions must be prepared in endotoxin-free water. The ion exchange components are subsequently rinsed free of acid and base with endotoxin-free water, mixed in the desired ratio and packed into a clean housing which may be a column or any other shaped container appropriate to carry out the deionization process. The deionization may also be performed in a system in which the deionizing components are continuously regenerated. This can be effected by electrolysis or any other suitable method. The water from the membrane purification step is perfused through the deionization system which adsorbs the majority of conductive substances from the water while achieving some further endotoxin reduction (FIG. 2).

Figure 3:
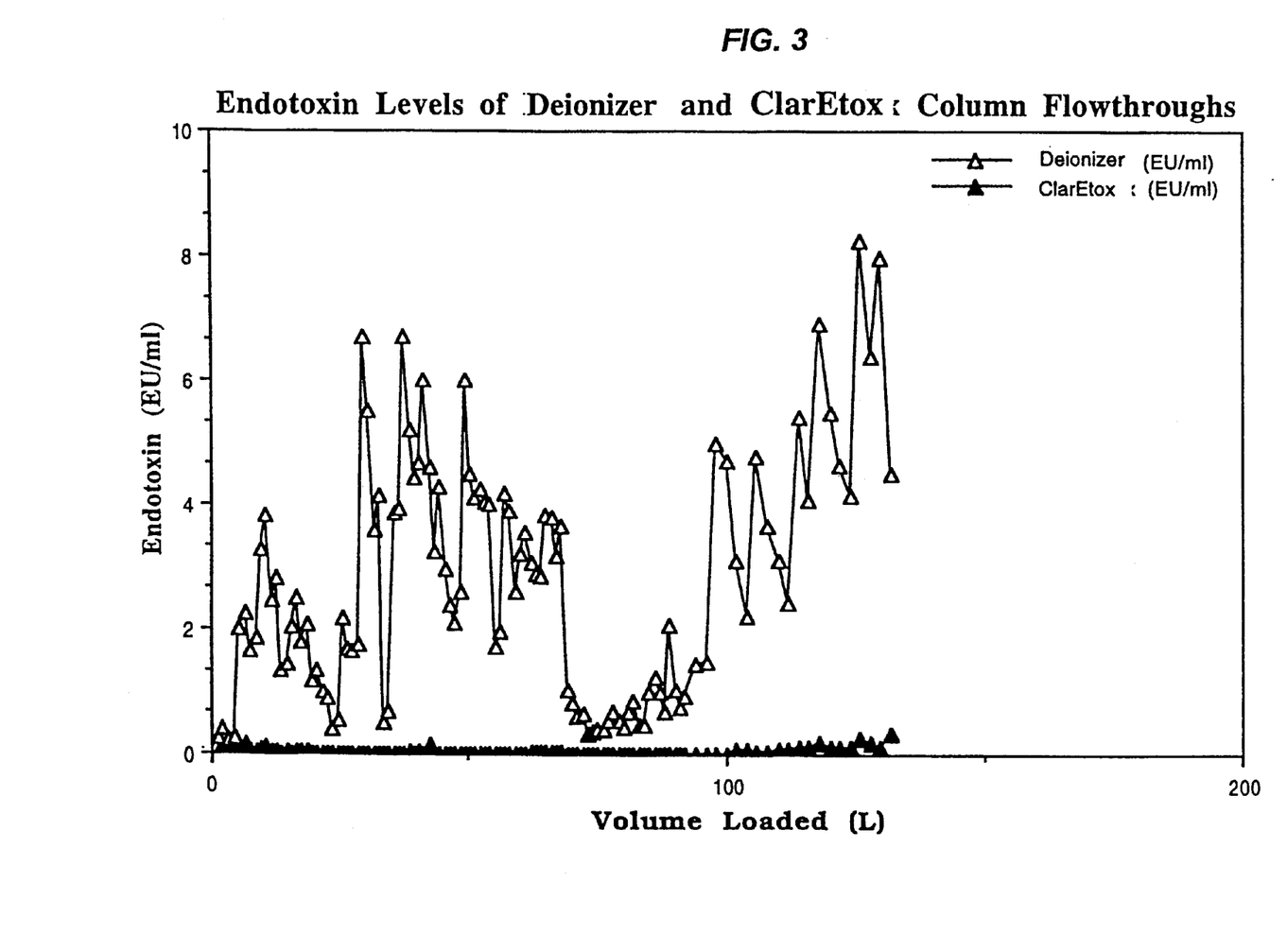
FIG. 3 is a diagram demonstrating endotoxin levels in water samples obtained from ion exchange and endotoxin-specific adsorption steps at the indicated days of operation when the two systems operated in a chain.

In the next step, the purified water from the deionization step is perfused through an adsorbent (ClarEtox) which removes residual endotoxin below the level of 0.25 EU/ml, specified in the US Pharmacopoeia for WFI, but preferably below 0.005 EU/ml, the sensitivity limit of the kinetic LAL assay. The adsorbent also adsorbs pyrogenic substances other than LPS and may be prepared in the configuration of particles or membrane or a combination of both. The adsorbent is derivatized with a ligand having high affinity for endotoxin and binds pyrogens by a dual mechanism (hydrophobic interaction and ionic interactions). An additional feature of this adsorbent is its cleanability with 1 M NaOH and that it is reusable at least 100 times after NaOH sanitization. This affords the required low cost, high throughput production of pyrogen-free water. In its most preferred embodiment, the ClarEtox particles are packed into a column and incubated overnight in 1 M NaOH followed by a wash with pyrogen-free water. The purified water from the deionization step is passed through the column and residual endotoxin is removed below the level specified by the Pharmacopoiea (FIG. 3).

Since non-LPS (LAL-negative) pyrogens also contribute to sample pyrogenicity, an assay other than the LAL test is necessary to evaluate pyrogens in samples. Such a test may be the USP rabbit pyrogenicity test. This however is rather tedious and impractical for this purpose for a variety of reasons. Moreover, the rabbit test does not provide information on subtoxic, low level inflammatory reactions induced by the sample. A more suitable test is based upon the peripheral blood mononuclear cell (PBMC) activation/cytokine assay that is equivalent to the rabbit test in assessing total sample pyrogenicity. PBMCs when exposed to pyrogens secrete inflammatory cytokines (IL-1, IL-6, IL-8, TNF-alpha, etc.) which can be detected at very low levels. This allows us to monitor low level chronic inflammatory reactions which have eluded the rabbit test.

Figure 4:
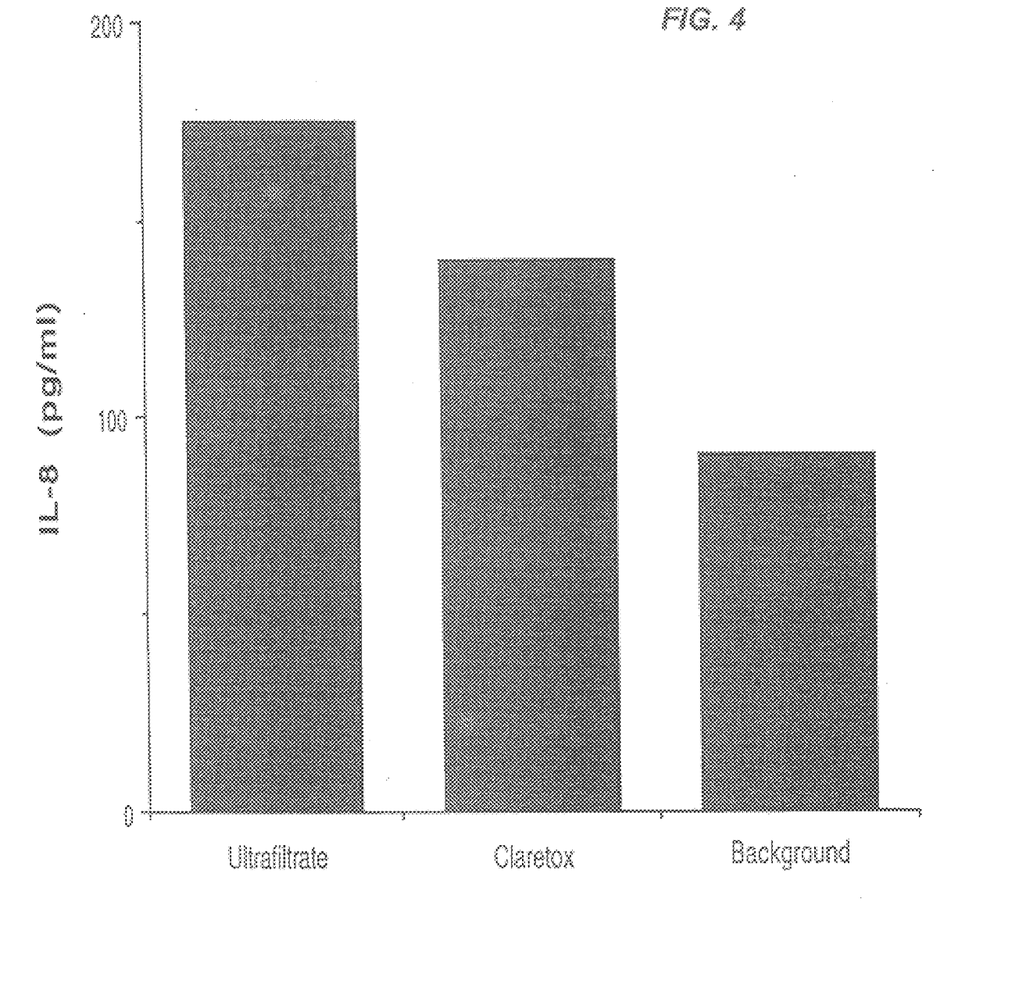
FIG. 4 is a diagram demonstrating IL-8 levels in sample obtained from ultrafiltration of *Pseudomonas maltophilia* culture supernatant as well as ClarEtox-treated sample.

We have used a supernatant from the culture of *Pseudomonas maltophilia,* a primary water-born microorganism, to challenge the ClarEtox adsorbent along with a control ultrafilter, having a MW cutoff of 20 kDa. The details of the experiment is described under Examples. We have found that both the ultrafilter and ClarEtox greatly reduced LAL-positive (LPS) pyrogenicity (Table 1). However, the ultrafiltrate of the bacterial supernatant showed significant IL-8 induction in the PBMC assay (FIG. 4). The ClarEtox-treated bacterial sample displayed a reduced IL-8 induction.

Figure 5:
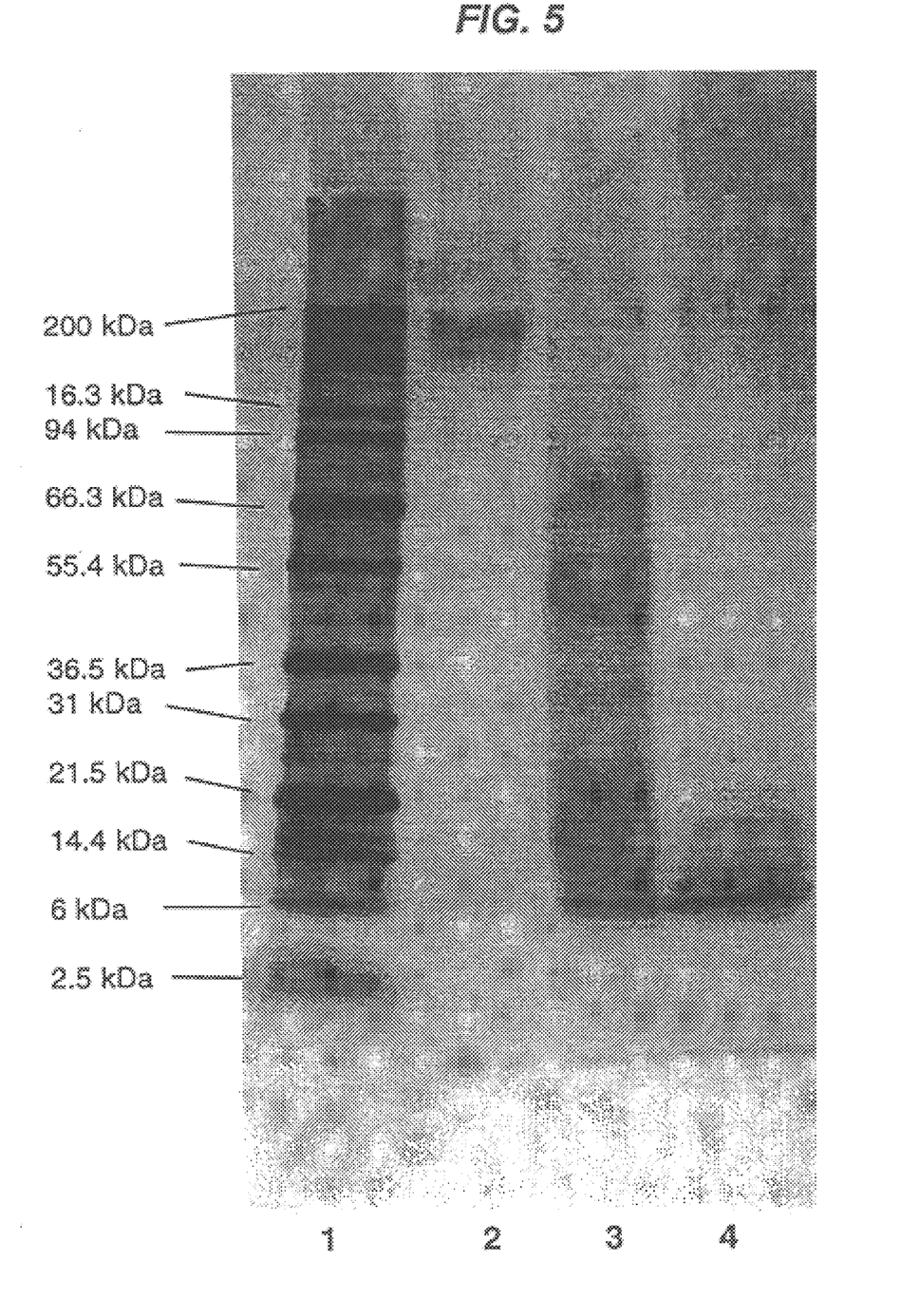
FIG. 5 is a reducing SDS-PAGE of the Pseudomonas supernatant ultrafiltrates. Sterile *Pseudomonas maltophilia* culture supernatant was filtered on a Fresenius F-80A dialyzer used as a dead-end ultrafilter. The culture supernatant was ultrafiltered at 50-fold and 5-fold dilutions as well as the undiluted stock. The ultrafiltrates were concentrated 25-fold before analysis on a 4–20% Tris-Glycine reduced SDS-PAGE. The protein bands were developed by a combination of Coomassie blue and silver staining. Lane 1, MW Std., Lane 2, 50× diluted supernatant ultrafiltrate, Lane 3, 5× diluted supernatant ultrafiltrate, Lane 4, undiluted supernatant ultrafiltrate.

It is widely thought that ultrafilters are impenetrable for proteins having molecular weights higher than their molecular weight cut-off. Since bacterial proteins can be pyrogenic, therefore, we have analyzed the ultrafiltrate for protein composition. The different ultrafiltrates were concentrated 25-fold and run on a reducing 4–20% SDS-PAGE (FIG. 5). A double staining method was used to visualize the protein bands in the samples (Morrissey, J. H. Anal. Biochem. (1981) 117:307–310). Background staining was removed using Kodak Rapidfix (Wray, W. et al. Anal. Biochem. (1981) 118:197–203). We have found that proteins having molecular weights much higher than the molecular weight cutoff of the membrane (20 kDa) do penetrate the ultrafiltration membrane even if their concentration in the ultrafiltrate was low (the ultrafilter rejected approx. 95% of the input protein). This raises the possibility of intact exotoxin A crossing the membrane. A low molecular weight moiety (~500–1000 Da) was also detected which may be the same pyrogen described by Mahiout at al. and Massion et al. The data demonstrate the permeability of ultrafilter by Pseudomonas culture components.

In another experiment, RO water was tested for endotoxin activity (LAL assay) and total pyrogenicity (IL-8 induction) in the PBMC assay (Table 2). The endotoxin level was reduced below 0.005 EU/ml, a 4 logs reduction in LPS. The PBMC assay also showed greatly reduced IL-8 levels. The details of these experiments are disclosed in the Examples.

Figure 6:
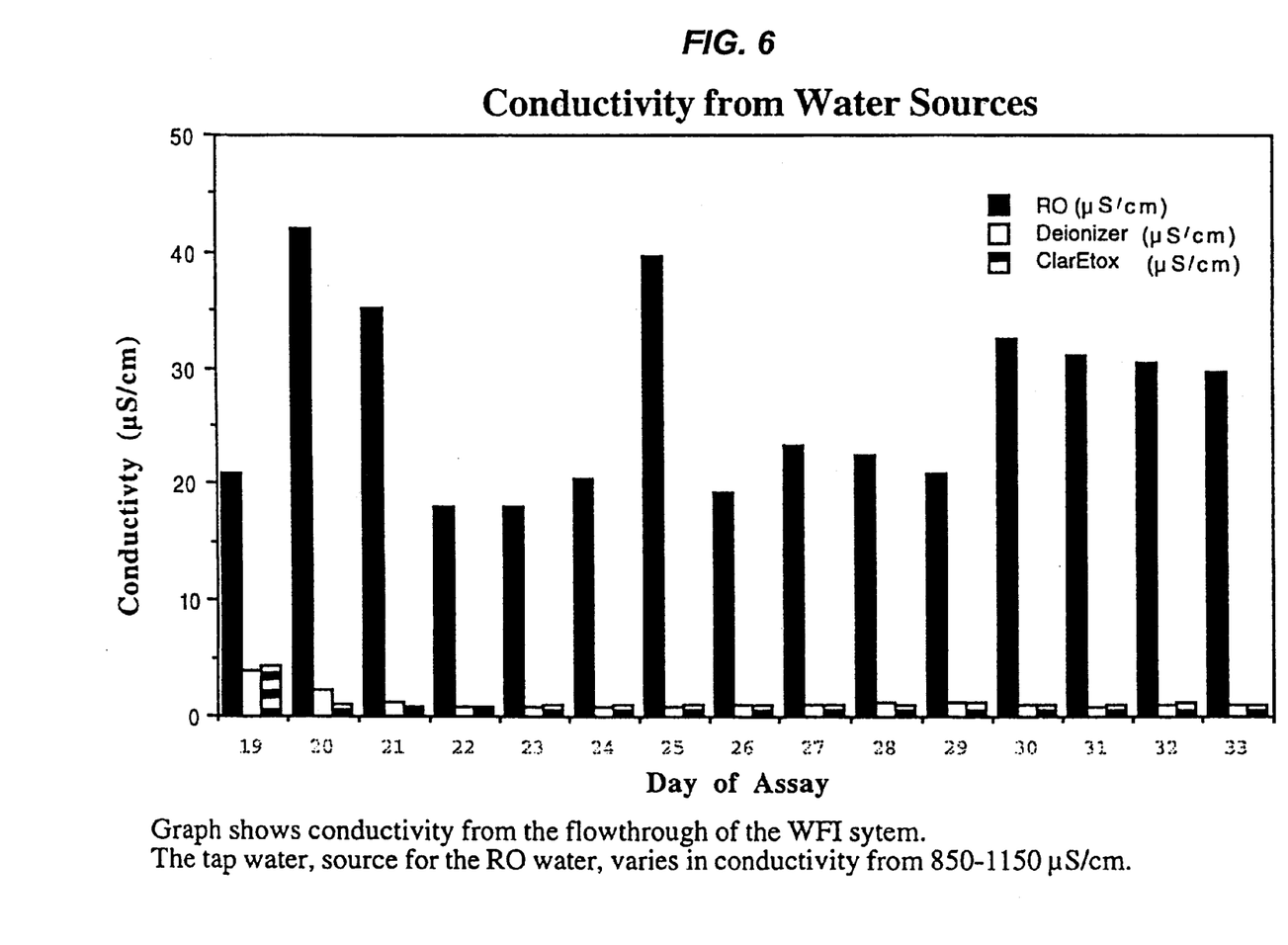
FIG. 6 is a diagram of conductivity readings from the various water samples.

The conductivity of the water was monitored at every stage of purification. The conductivity of tap (potable) water was around 1000 µS/cm. The RO step reduced it to 20–40 µS/cm which was reduced below 1–2 µS/cm (FIG. 6) by the deionization step. The endotoxin removing column did not significantly affect water conductivity.

Figure 7:
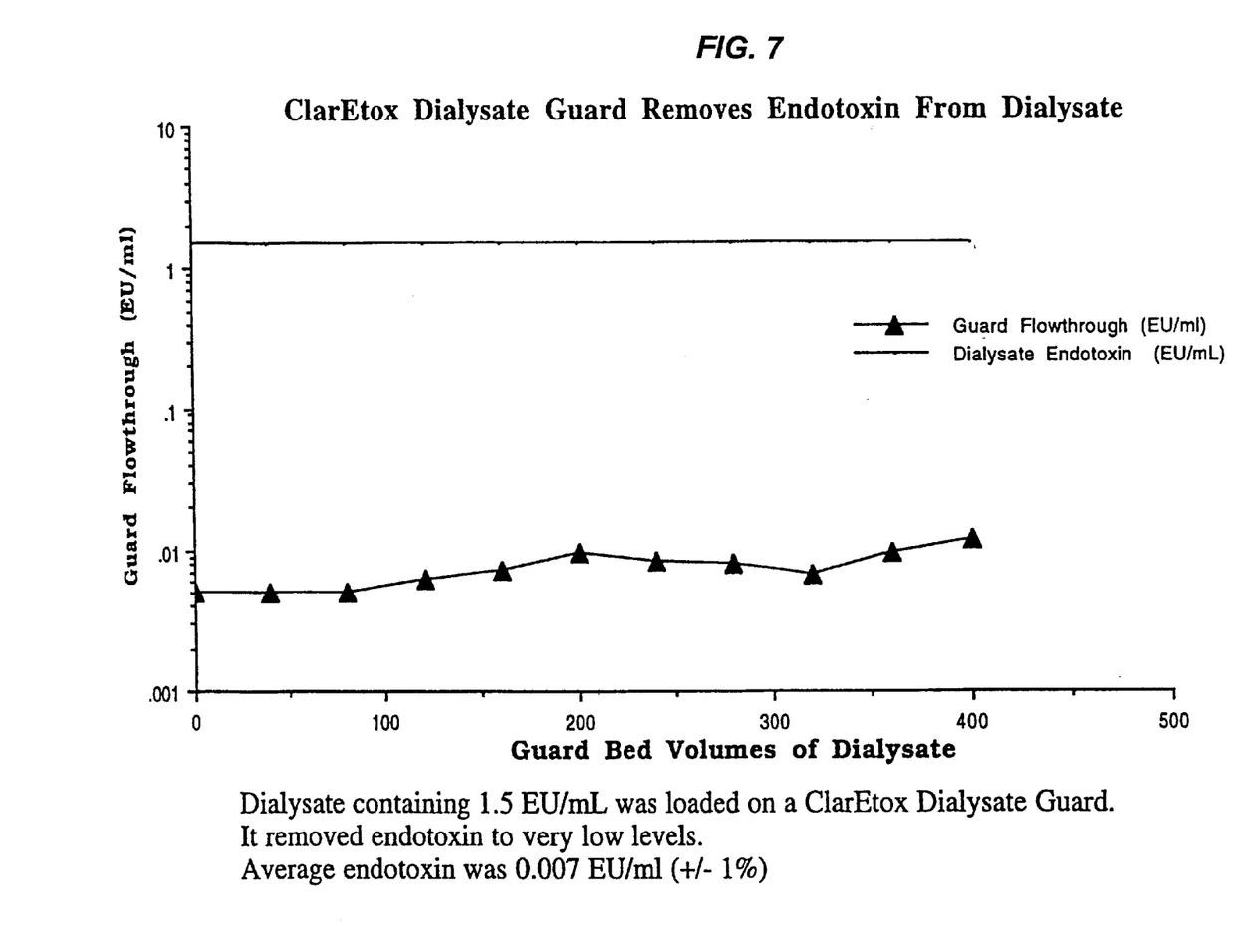
FIG. 7 is a diagram demonstrating endotoxin levels in dialysate samples obtained from the endotoxin-specific adsorption step.

The ClarEtox column also removed endotoxin from dialyzate (hemodialysis solution). It was imperative that the column would not affect the composition of dialyzate because any electrolyte imbalance or osmolarity deviations would cause potentially life-threatening complications. The ClarEtox column was prepared as described and dialyzate passed through. The ion and glucose composition of dialyzate was measured before and after the ClarEtox column. There was no change between the observed values indicating that the column did not change the composition of dialyzate. The dialyzate contained 1.5 EU/ml endotoxin. After the ClarEtox column endotoxin levels remained below 0.01 EU/ml (FIG. 7).

The following Examples illustrate the advantages of the subject invention. Accordingly, it is to be understood that the description in this disclosure is to facilitate comprehension of the invention and should not be construed to limit the scope thereof as persons skilled in the art can, in light of this disclosure, generate additional embodiments without exceeding the scope or departing from the spirit of the claimed invention.

EXAMPLES

Example 1

Preparation of *Pseudomonas maltophilia* Supernatant

*Pseudomonas maltophilia* was obtained from ATCC# 17666 Aug 10, 1966, and the bacterial culture broth from Difco Laboratories (Detroit, Mich.). The culture was grown at 37° C. and LPS in the supernatant was monitored periodically by the LAL assay. The total culturing time was 48 h. Then the culture was refrigerated at 4° C. and centrifuged at 2,000×g. To the supernatant 20 µg/ml Gentamicin (Sigma, St. Louis, Mo.) and 5 µg/ml Ciprofloxacin (Bayer, West Haven, Conn.) were added. The supernatant was sterile filtered and aliquoted for freeze storage. The sterility of the filtrate was ascertained using agar-plate culture. No colony growth was observed. The LPS concentration was 24,000 EU/ml.

Example 2

Ultrafiltration of Sterile Filtered Pseudomonas Supernatant

The ultrafiltration was carried out at 37° C. using a Fresenius (Ogden, Utah) F80A dialyzer as a dead-end filter. To achieve this, the upper-port of the blood-compartment and the lower-port of the dialyzate-compartment were closed. The module was rinsed out with one liter of LAL-Water (Charles River) prior to the start of the filtration. Five-fold, 50-fold and 100-fold dilutions of the supernatant were prepared with LAL water and ultrafiltered at 100 ml/min. Approximately 500 ml fractions were collected and the sterility of the filtrate was ascertained using agar-plate culture. No colony growth was found. The LPS content of the ultrafiltrate of the 100-fold diluted sample was 0.175 EU/ml. The ultrafiltration removed most of the detectable LAL-positive pyrogens (LPS). When the ultrafiltrate was applied to ClarEtox, further reduction in LPS was observed (Table 1).

TABLE 1

Removal of LAL-positive pyrogens (LPS) by ultrafiltration and ClarEtox adsorbent

| Samples | LPS(EU/ml) | LPS(EU/ml) after ClarEtox |
|---|---|---|
| Undiluted Pseudomonas supernatant | 22,170 | |
| 100-fold diluted supernatant | 717 | <0.005 |
| 100-fold diluted supernatant ultrafiltrate | 0.175 | 0.010 |

Example 3

Preparation of Human Peripheral Blood Mononuclear Cells

Approximately 25 ml blood was drawn from healthy volunteers and the mononuclear cells isolated by Ficoll-Hypaque gradient centrifugation. After the separation step about 25 x 106 cells were obtained. The cells were resuspended in 10 ml PBS containing 1% BSA. The cells were adhered to a 6-well microtiter plate after resuspension in 20% fetal calf serum (FCS), RPMI-1640 at $2 \times 10^6$ cells/ml for 5 h at 37° C. in a 5% $CO_2$ atmosphere. After mild agitation the medium with non-adherent cells was removed, cells counted and the number of adherent cells determined. Then 2 ml RPMI-1640 with 20% FCS supplement and 100 U/ml PenStrept solution were added followed by the necessary stimulant as endotoxin solution or the sterile filtered, and ultrafiltered Pseudomonas supernatants as well as RO water samples. Each sample as well as the controls were incubated for 1.5–16 hr at 37° C. in a 5% $CO_2$ atmosphere. The supernatants were removed and tested for IL-8 induction.

Example 4

Sandwich ELISA to Quantitate IL-8 Induction in Samples

For the assays the Predicta® Interleukin-8 Kit [Genzyme Diagnostics (Boston, Mass.)] was used. The kit contains a 96-well microtiter plate with immobilized Anti-human IL-8, IL-8 biotinylated antibody, IL-8 standard, SA reagent, and substrate (peroxide). The readout is at 450 nm. The assay was performed following the manufacturer's directions.

Example 5

Preparation of ClarEtox

Epibromohydrin-activated, 4% crosslinked agarose beads (trademarked as Actigel B Ultraflow 4) were from Sterogene Bioseparations, Inc., Carlsbad, Calif., USA. To couple the ligand, 1 L of epibromohydrin derivatized matrix was washed with 1 L dry ethanol three times. Stearylamine, 270 g, was dissolved in 1 L ethanol with gentle warming and added to the resin. The slurry was mixed in a closed container at room temperature for 24 h. The matrix was suction-dried and agitated with 2 L of acetone overnight followed by a wash with 10 L of ethanol and ample deionized water.

Example 6

Secondary Crosslinking and Quaternerization of Amine

To 1 L of coupled resin 1 L of deionized water and 0.1 L 2,3-dibromopropanol was added and stirred for 30 mm. Then 0.44 L of 5 M NaOH was pumped in over a period of 1 h and the slurry was mixed for another 1.5 h. The resin was filtered on a Buchner funnel and washed with 10 L of ethanol and water to neutrality.

Example 7

Preparation of Deionization Column

Cation exchange resin was allowed to sit in 1M NaOH overnight and anion exchange resin sit in 1 M HCl overnight. The resins were washed with LAL water until neutrality and mixed together thoroughly. A 50 ml column was packed with the mixed resin. The column and all wetted parts were previously incubated in 1 M NaOH overnight and rinsed with LAL water to neutral.

Example 8

Endotoxin Adsorption from Pseudomonas Supernatant

A column was packed with 9 ml of ClarEtox resin. At 3 ml/min 50 ml 1 M NaOH was pumped into the column and was allowed to sit in the NaOH overnight. The column and the tubings were rinsed with LAL water to neutrality. The column was then perfused with a 100-fold diluted Pseudomonas supernatant at 3 ml/min and fractions were collected. Endotoxin was measured by the LAL assay and total pyrogens were determined by the PBMC assay using IL-8 measurements as a readout. Endotoxin in the diluted supernatant was 171 EU/ml. The endotoxin was reduced below 0.005 EU/ml by ClarEtox. ClarEtox also reduced IL-8 induction by the sample to a level lower than that of the comparable ultrafiltrate (FIG. 4).

Example 9

Endotoxin Adsorption from RO Water

A column was packed with 9 ml of ClarEtox resin. At 3 ml/min 50 ml 1 M NaOH was pumped into the column and was allowed to sit in the column overnight. The column and the tubings were rinsed with LAL water to neutrality. The column was then perfused with RO water at 3 ml/min and fractions were collected periodically. Endotoxin was measured by the LAL assay and total pyrogens were determined by the PBMC assay using IL-8 measurements. Endotoxin levels in the RO water was 17.6 EU/ml. Before applying to ClarEtox and the PBMC assay, the RO water was sterilized by autoclaving. The endotoxin was reduced below 0.005 EU/ml by ClarEtox. ClarEtox also greatly reduced IL-8 induction by the sample (Table 2).

TABLE 2

Removal of Pyrogens from RO Water by ClarEtox Adsorbent

| Samples | LPS(EU/ml) | LPS(EU/ml) after ClarEtox | IL-8 (pg/ml) | IL-8 (pg/ml) after ClarEtox |
|---|---|---|---|---|
| RO water | 17.6 | <0.005 | 39.5 | 1.4 |

Example 10

Endotoxin Adsorption from Dialysate

A column was packed with 9 ml of ClarEtox resin. At 3 ml/min 50 ml 1 M NaOH was pumped into the column and was allowed to sit in the column overnight. The column and the tubings were rinsed with LAL water to neutrality. The column was perfused with dialysate at 3 ml/min and fractions were collected periodically. The endotoxin level in dialysate was 1.5 EU/ml that was reduced below 0.01 EU/ml by ClarEtox (FIG. 7).

Example 11

The Water Purification System

The RO water line was attached to the inlet port of the deionizer column and water was passed through the two column apparatus (deionizer plus ClarEtox) at 11–13 ml/min continuously, taking samples each day for endotoxin determination and conductivity measurements. The RO water was continuously pumped through the system until endotoxin level in the ClarEtox column effluent reached 0.25 EU/ml (FIG. 3). It took 130 L of water to reach this breakthrough point. This translates into 13,000 volumes of purified water obtained on every ml of ClarEtox resin. Since the resin is reusable at least 100 times, this translates into 1,300,000 volumes of purified water per volume of resin. To ensure sterility of the final product water an absolute bacterial filter is placed at the end of the system.

It will be understood that in giving the preferred embodiment and application of the invention, the concept and scope of the invention is not limited to the specific reagents but certain changes and modifications may be practical within the scope of the appended claims. Therefore it is intended that the protection be limited only by the definitions of the appended claims.

What is claimed is:

1. A pyrogen-specific absorbent composition comprising a polymeric support and a multiplicity of ligands comprising a ($C_{10}$–$C_{24}$) alkylamino group, wherein at least a portion of said ligands is crosslinked.

2. The composition of claim 1 wherein said ligands are crosslinked at the amino group with an alkyl group.

3. The composition of claim 1 wherein said polymeric support is agarose.

4. The composition of claim 1 wherein said polymeric support is a membrane.

5. The composition of claim 1 wherein said polymeric support is a particle.

6. The composition of claim 1 wherein said composition is endotoxin-specific.

7. The composition of claim 1 made by the process of:

a) derivatizing a polymeric support with an epihalohydrin;

b) reacting said derivatized support with a ($C_{10}$–$C_{24}$) alkylamine; and c) crosslinking at least a portion of the alkylamino groups and quaternizing at least a portion of the amino moieties by reacting said support with a halogenated alkyl alcohol.

8. The composition of claim 7 wherein in said process the epihalohydrin is epibromohydrin.

9. The composition of claim 7 wherein in said process said polymeric support is agarose.

10. The composition of claim 7 wherein in said process said alkylamine is stearylamine.

11. The composition of claim 7 wherein in said process said alcohol is 2,3-dibromopropanol.

12. A method for removing pyrogens from a fluid comprising contacting said fluid with a composition of claim 1 or 7.

13. A method according to claim 12 wherein said pyrogens are endotoxins.

14. The method of claim 12 further comprising, prior to said contacting step, filtering said fluid through a membrane.

15. The method of claim 14 wherein said filtering step comprises reverse osmosis.

16. The method of claim 14 wherein said filtering step comprises ultrafiltration.

17. The method of claim 14 further comprising, after said filtering and prior to said contacting step, deionizing said fluid.

18. The method of claim 17 further comprising, after said contacting step, filtering said fluid.

19. The method of claim 14 wherein said fluid is water.

20. The method of claim 19 wherein said fluid is rendered substantially free of endotoxin.

21. The method of claim 14 wherein said fluid is dialyzate.

* * * * *